Aug. 5, 1969   J. A. TABOR   3,459,250
PREVAILING-TORQUE LOCKSCREWS
Filed Oct. 7, 1968   9 Sheets-Sheet 3

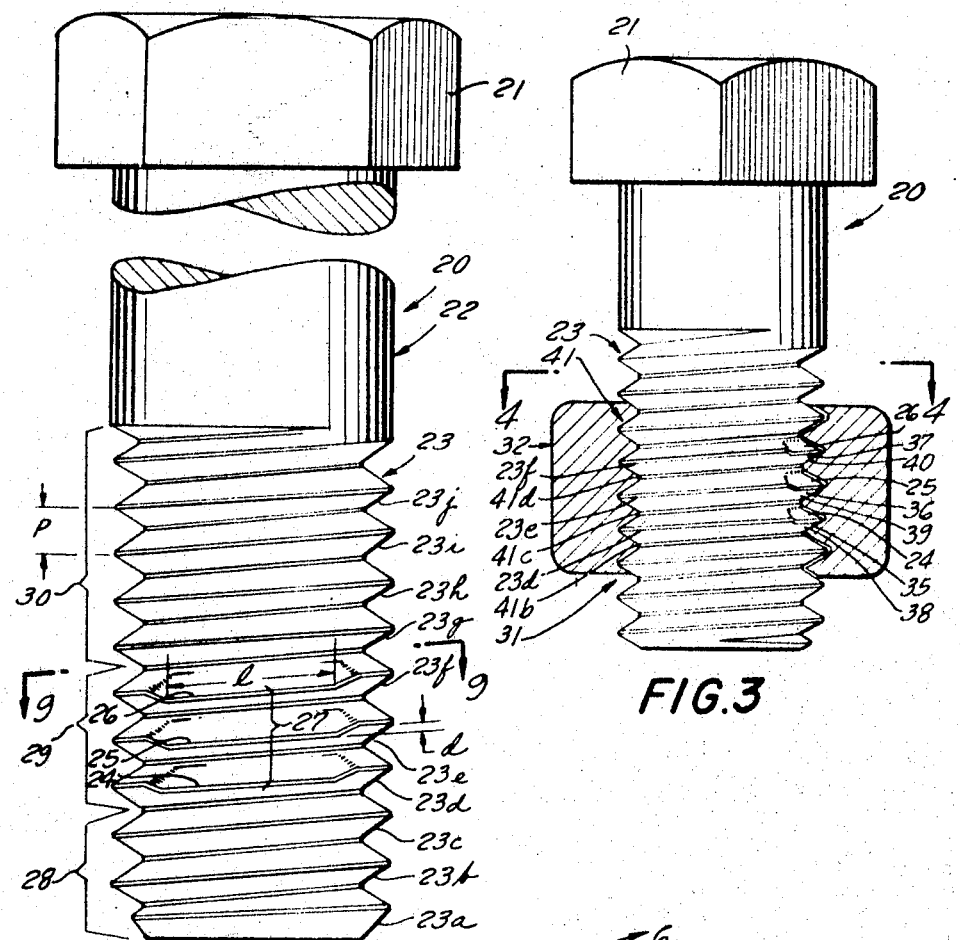
FIG.1
FIG.3
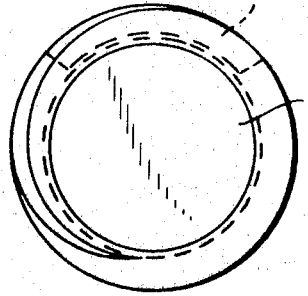
FIG.2
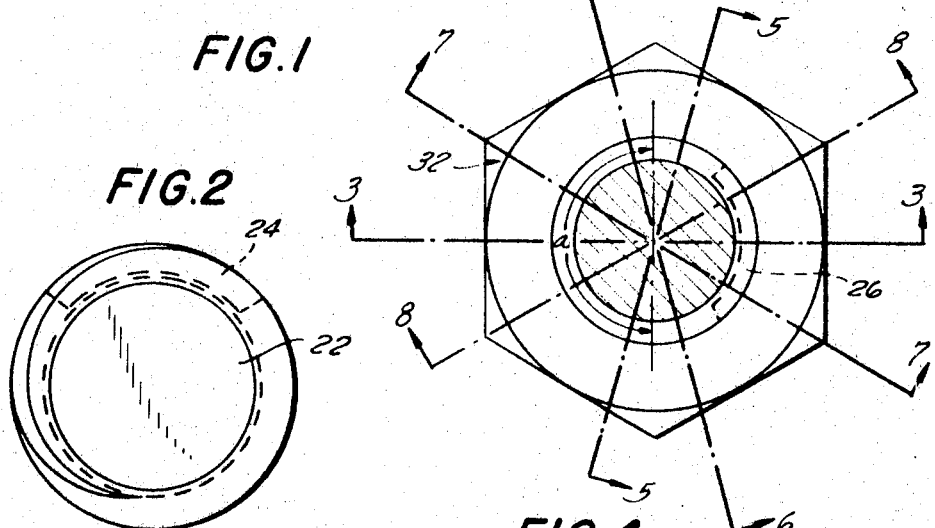
FIG.4

FIG. 14
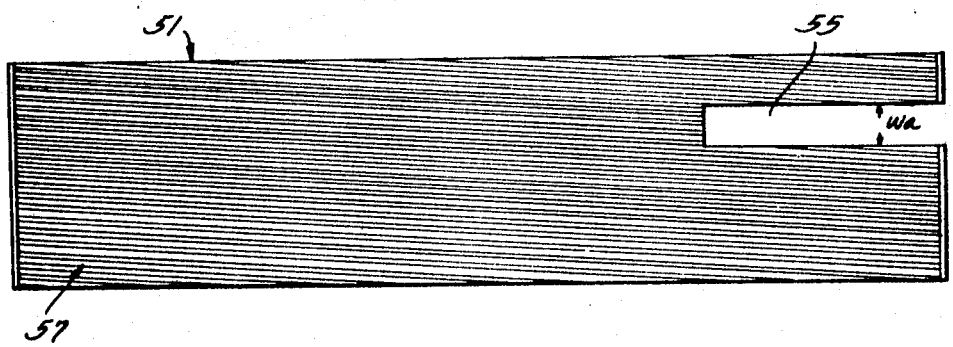
FIG. 15
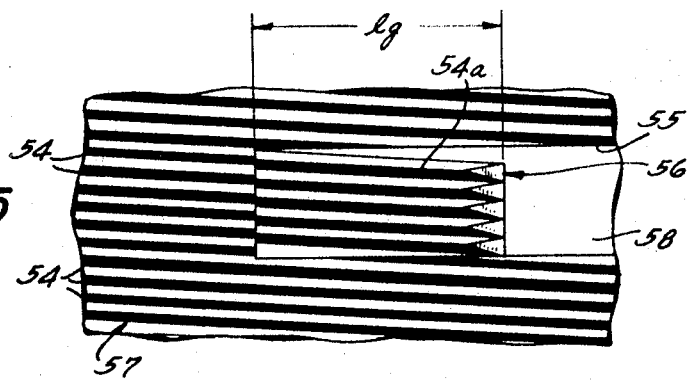

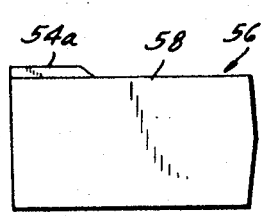
FIG. 16a

Aug. 5, 1969 J. A. TABOR 3,459,250
PREVAILING-TORQUE LOCKSCREWS
Filed Oct. 7, 1968 9 Sheets-Sheet 5

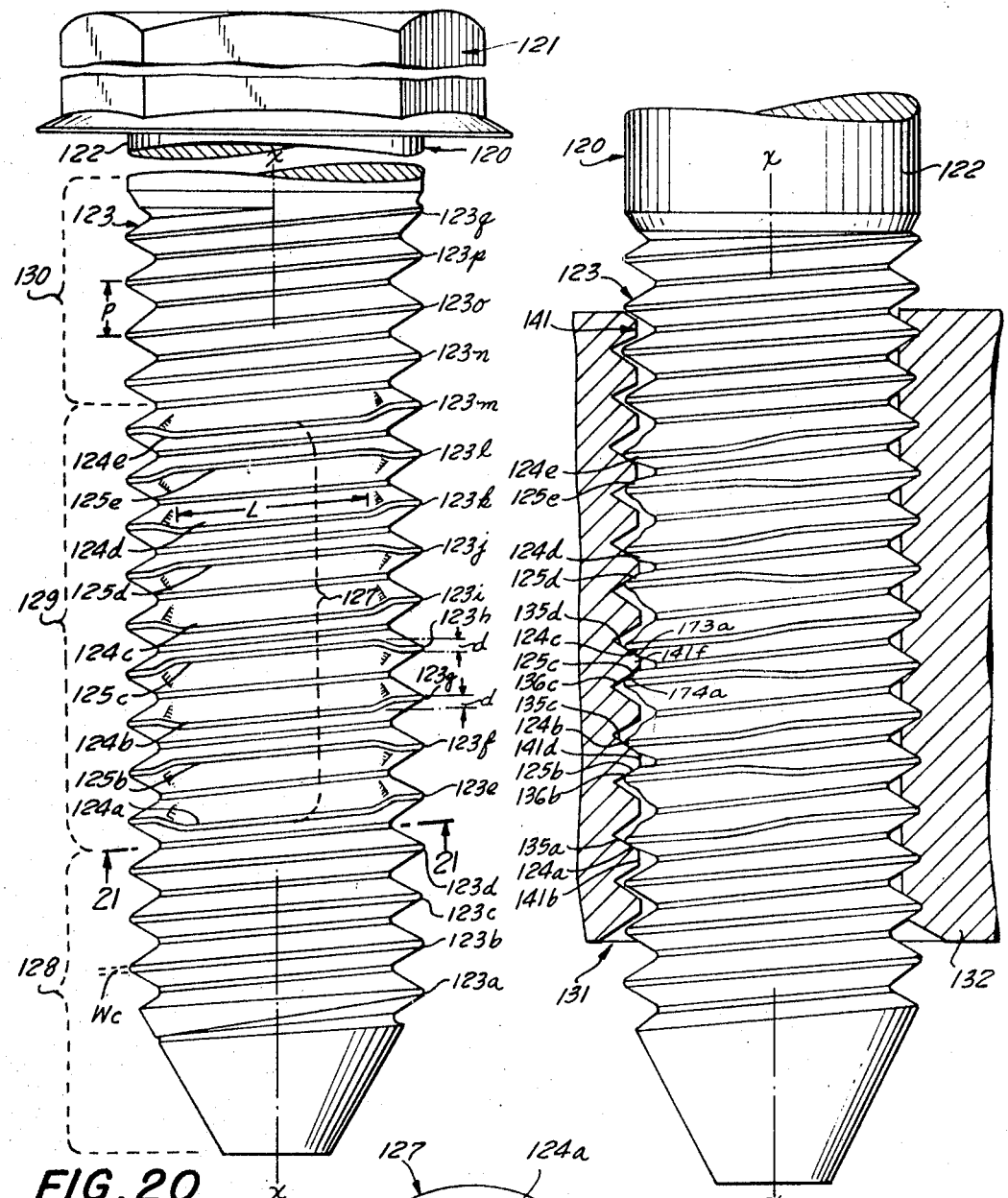
FIG.20
FIG.22
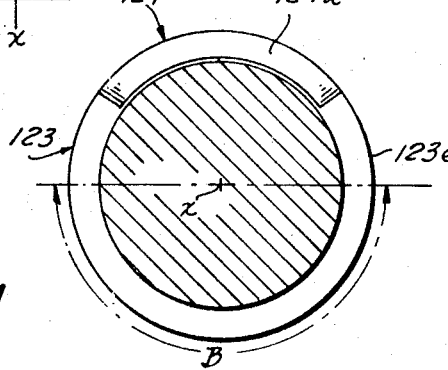
FIG.21

Aug. 5, 1969    J. A. TABOR    3,459,250
PREVAILING-TORQUE LOCKSCREWS
Filed Oct. 7, 1968    9 Sheets-Sheet 9

United States Patent Office 3,459,250
Patented Aug. 5, 1969

3,459,250
PREVAILING-TORQUE LOCKSCREWS
Joseph A. Tabor, Greenwich, Conn., assignor to Burdsall Russell & Ward Bolt and Nut Company, Port Chester, N.Y., a corporation of New York
Continuation-in-part of application Ser. No. 630,887, Apr. 14. 1967. This application Oct. 7, 1968, Ser. No. 765,595
Int. Cl. F16b 39/30, 39/284
U.S. Cl. 151—22                                17 Claims

ABSTRACT OF THE DISCLOSURE

Prevailing-torque lockscrews in which certain threads are deflected to form a cluster of offet thread segments producing spring action friction on mating female thread. The root diameter and root lead of the thread on the lockscrew are uniform throughout the length of the thread, and each of the offset thread segments lie throughout their lengths at the same helix angle as that of the remainder of the thread.

---

This invention relates generally to metal threaded fasteners and more particularly to lockscrews of the prevailing-torque type.

This application is a continuation-in-part of copending application Serial No. 630,887, filed Apr. 14, 1967, now abandoned.

Lockscrews are of two general kinds; namely, prevailing-torque and free spinning types. Prevailing-torque lockscrews spin freely for a few turns, then must be wrenched to final position. Locking power is reached when the part or parts of the screw thread that provides the locking feature and the mating thread of the bore of the female part of the assembly are engaged. The locking action or locking effect is maintained until the screw or female part is turned sufficiently in loosening direction to disengage the locking part of the screw shank from the thread of the female threaded bore. While there are different types of prevailing-torque lockscrews, each type has some feature in the thread, such as distortion, interference fit, or addition of a resilient material, which requires the screw to be wrenched during assembly with the female part. Locking is accomplished through pressure friction or elastic deformation developed between the thread of the screw and the mating thread of the female part.

SUMMARY OF INVENTION

Lockscrews made according to this invention are of the all metal type having distorted threads and more particularly clusters of distorted, i.e. offset, segments of the threads wherein the distorted segments are of substantial arcuate length and these segments are distorted, i.e. offset, in an axial direction in a manner to provide a number of vertically aligned deformations of substantial arcuate length so that the deformed segments throughout their arcuate lengths are offset from the remainder of the thread but have the same helix angle throughout their arcuate lengths as the helix angle of the remainder, or undistorted portions, of the thread of the screw shank. That is, the vertically aligned distorted or offset segments or deformations provide a cluster of locking segments of substantial arcuate length, each of which lies at the same helix angle as the conventional helix angle of the undistorted or conventional portion of the thread.

An advantage of such a screw over prior all metal prevailing-torque lockscrews is that the offset locking segments exert friction on the flanks of the thread of the mating tapped bore with a spring action uniformly distributed throughout the arcuate lengths of the locking segments. Furthermore, when a screw, made according to the invention, is screwed home into a mating female threaded bore into locking position, the cluster of vertically aligned, offset locking segments exert forces in a direction which causes the flanks of the thread of the screw in the 180° arc diametrically opposite the cluster of offset segments to exert an additional friction on the flanks of the mating female thread in that arc, thus enhancing the overall locking effect.

Although the novel features which are believed to be characteristic of the invention are pointed out in the annexed claims, the invention itself as to its objects and advantages and the manner in which it may be carried out may be better understood by reference to the following more detailed description, considered in connection with the accompanying drawings, forming a part hereof, in which, FIG. 1 is a view in elevation, partly broken away, of a hexagon head screw embodying the invention;

FIG. 2 is a view looking toward the leading end of the screw shown in FIG. 1;

FIG. 3 is a sectional view in elevation of the screw shown in FIG. 1, to smaller scale, screwed into locked position in a mating threaded bore of a nut, on line 3—3 of FIG. 4; the screw being shown in elevation and having been turned 90° from the position shown in FIG. 1.

FIG. 4 is a view on line 4—4 of FIG. 3;

FIG. 14 is a face view of the moving or travelling die of a pair of dies for rolling the thread on the shank of the screw shown in FIG. 1; the special insert for rolling the offset segments in the thread having been removed from its slot;

FIG. 15 is a fragmentary view to larger scale of the face of the moving die; the special insert for offsetting the locking segments being in place in its recess;

FIG. 16a is a side view of the insert shown in FIG. 16;

Figure 23:
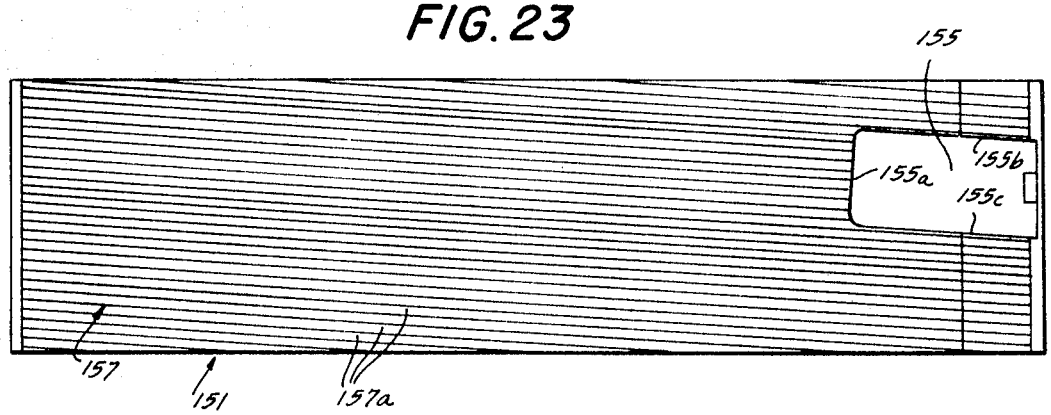
Figure 24:
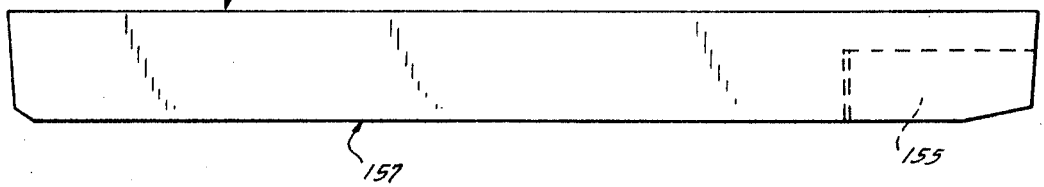
Figure 25:
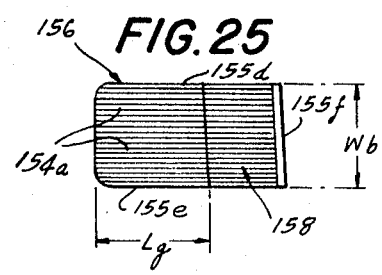
Figure 26:
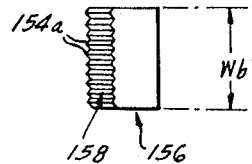
Figure 24A:
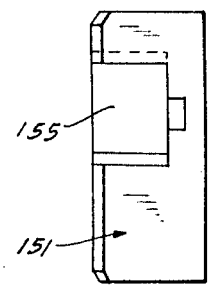
Figure 27:
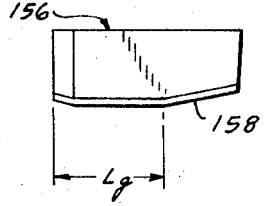
Figure 28:
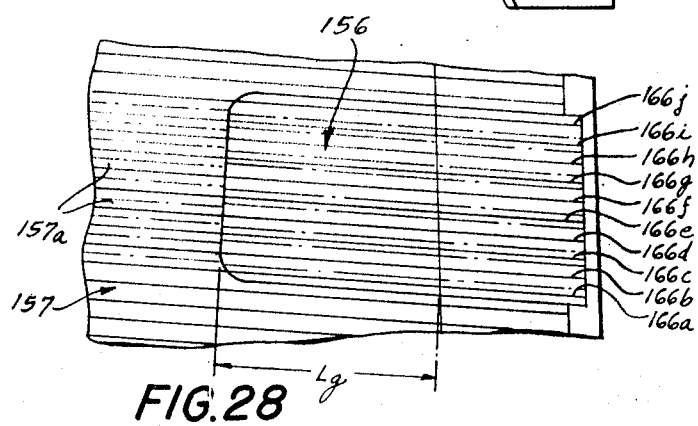
Figure 29:
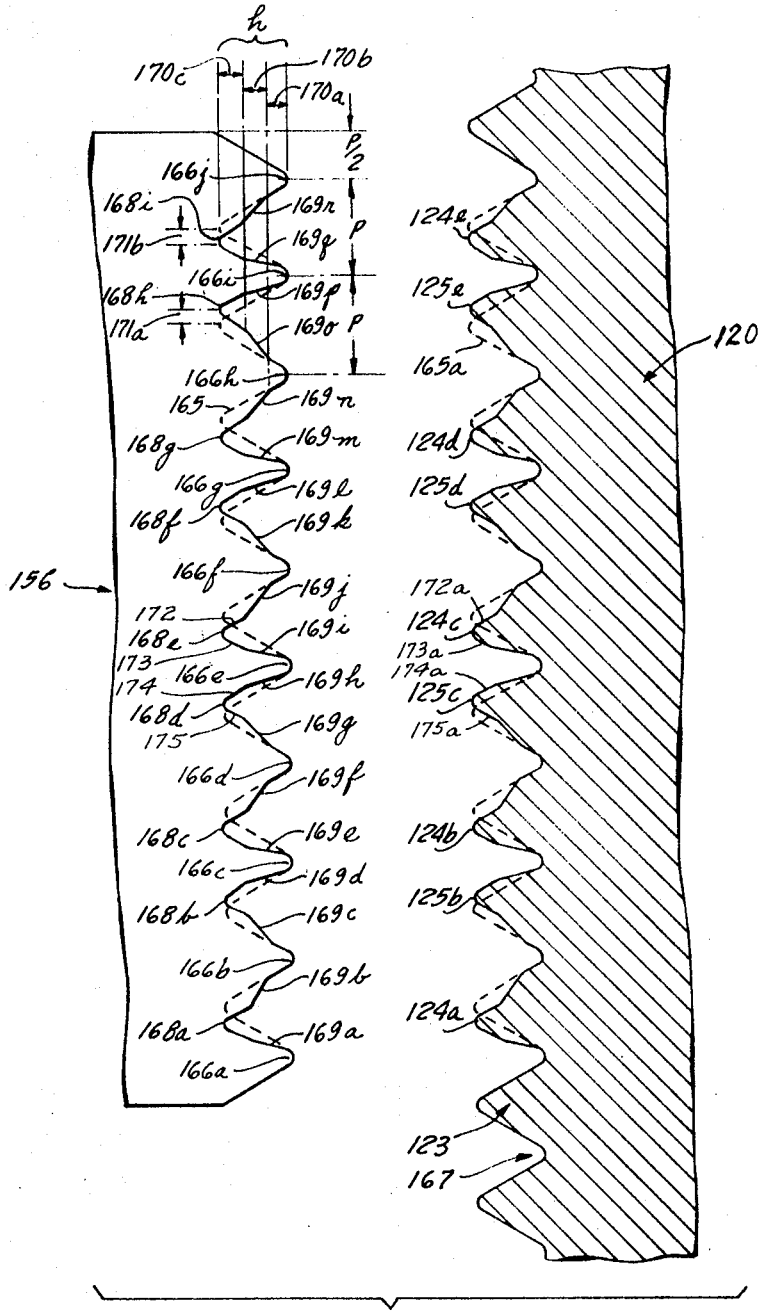
Figure 30:
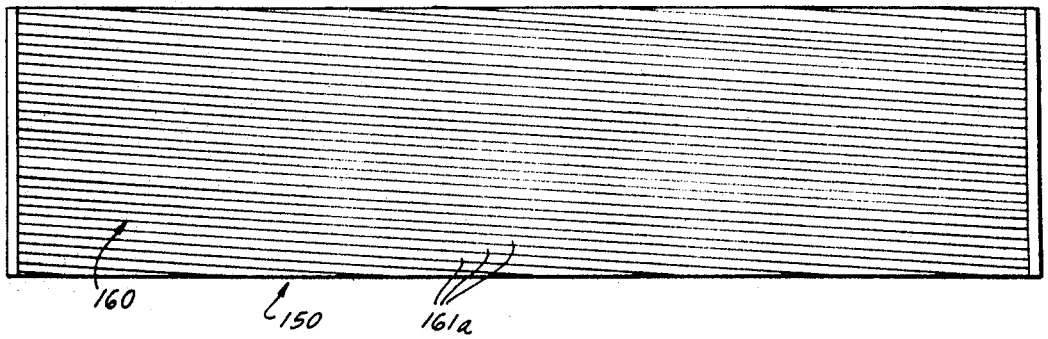
Figure 31:
Figure 32:
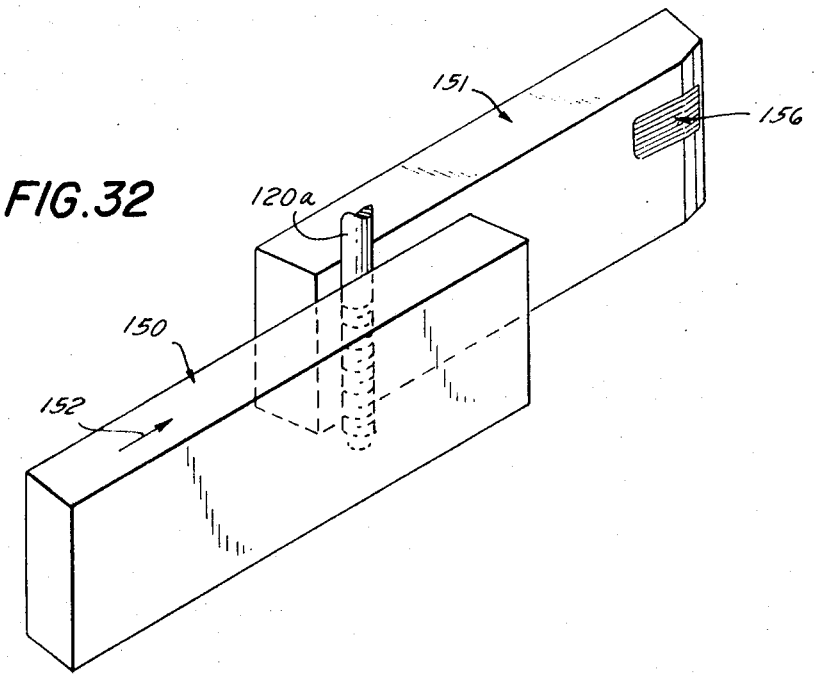

FIG. 20 turned 90° from that shown in FIG. 20; the which the thread segments of adjacent pairs of offset thread segments are offset axially toward each other;

FIG. 21 is a view on line 21—21 of FIG. 20;

FIG. 22 is a view in elevation of the screw shown in FIG. 20 turned 90° from that shown in FIG. 20; the screw being screwed into the threaded bore of a work piece;

FIG. 23 is a face view of a stationary thread rolling die showing a slot for insertion of a thread rolling insert for forming the offset thread segments;

FIGS. 24 and 24A are, respectively, a top plan view and an end view of the die shown in FIG. 23;

FIGS. 25, 26, and 27 are, respectively, a face view, an end view, and a top plan view of the insert for the slot shown in FIG. 23;

FIG. 28 is a fragmentary view to larger scale showing the die insert positioned in its slot in the stationary die of FIG. 23;

FIG. 29 is a view largely diagrammatic to illustrate the profile of the grooves of the insert for forming the cluster of offset thread segments on the screw thread of FIGS. 20–22 by the insert of FIGS. 25–28;

FIGS. 30 and 31 are, respectively, a face view and top plan view of the travelling thread rolling die to operate in conjunction with the stationary die shown in FIGS. 23–28; and FIG. 32 is a view in perspective to illustrate the operation of the thread rolling dies.

The threaded fastener herein described is referred to as a screw, but it will be understood that the term is intended to comprehend the term bolt or other product having an external thread.

Referring now to the drawings, in which like reference characters indicate like parts throughout the several views, a screw 20, made according to the invention, comprises a head 21, a shank 22, having a thread 23, in which is located a plurality of vertically aligned offset segments 24, 25, 26, forming a cluster 27 of offset segments, or deformations which are herein sometimes called indentations; these offset segments being of substantial arcuate length.

The head, as shown, is a hexagon head and the thread 23 on the shank, but for the offset portions, is a standard or conventional V thread, having a standard or conventional helix angle and pitch $p$.

Any head or portion suitable to provide means for turning the screw by means of a wrench or other appropriate tool may be used in lieu of the hexagon head shown in the drawings. The threaded part of the shank may extend along the entire length of the shank, or it may terminate short of the head, as shown. And, if desired, there may be an unthreaded portion of smaller diameter at the leading end of the shank.

The threaded portion may be considered as having a leading end portion 28, a locking portion 29 which comprises the cluster 27 of offset segments, and a trailing end portion 30. The locking portion 29 comprises a plurality of offset segments 24, 25, 26, which are axially offset thread segments of substantial arcuate length, in successive turns 23d, 23e, 23f of the thread 23; these offset thread segments lying intermediate the leading end thread portion 28 and the trailing end thread portion 30.

In the embodiment, as shown in FIG. 1, there are three offset segments 24, 25, 26, in successive turns of the thread, but a different number of turns of the thread may be deflected to produce a cluster of vertically aligned offset segments; it being desirable, however, that the lowermost offset segment be sufficiently remote from the leading end of the thread to provide at least one and preferably at least two or three turns of the thread which are not distorted and are thus free spinning to facilitate starting the screw into its receiving conventionally tapped bore in the part into which the screw is to be inserted. In some instances it may be desirable to locate the cluster of offset locking segments nearer the trailing end portion of the threaded shank.

The arcuate length $l$ of each of the offset locking segments, as shown in FIG. 1, is approximately 25% of the arcuate length or circumference of a turn of the thread, measured along its crest. And each of the segments, as shown in FIG. 1, is offset from the remaining portion of the turn in which it is located by a depth $d$ which is approximately one-third of the pitch $p$ of the thread. However, the length of the offset segments may be greater or less than shown and preferably within the range of 10% to 40% of the circumference of a turn of the thread if it is desired to vary the locking effect. The depth $d$ of the offset of the locking segments should be less than half the pitch of the thread and may be within a range up to ⅜ of the pitch.

It is significant to note that the offset segments in the cluster 27 of locking segments are at the same helix angle along their entire lengths as the standard, conventional helix angle of the remaining undistorted portion of the thread 23. The consequence of this is that when the screw is screwed home into locking position into a mating tapped bore, the offset segments exert a spring action force downwardly upon the contacted upper flanks of the female thread of the tapped bore into which it is screwed and this spring action is uniformly distributed throughout the lengths of offset locking segments. By making the arcuate length of the offset segments longer, a greater frictional and spring action locking effect may be obtained and by decreasing the length, a decreased locking effect may be obtained. Also, by increasing or decreasing the depth of the offset, a greater or lesser locking effect may respectively be obtained.

Figure 5:
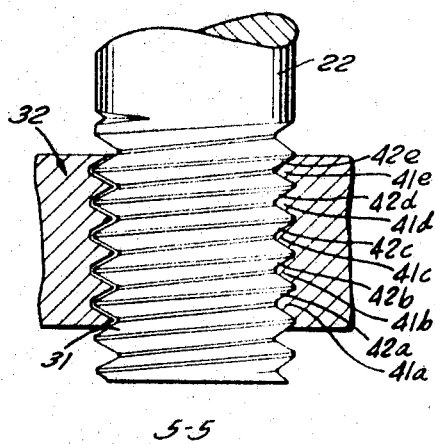
FIGS. 5, 6, 7, 8 are views respectively on lines 5—5, 6—6, 7—7, and 8—8 of FIG. 4; the threaded shank of the screw being shown in elevation.
Figure 6:
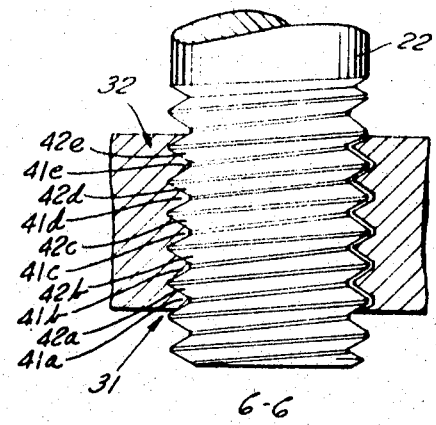
Figure 7:
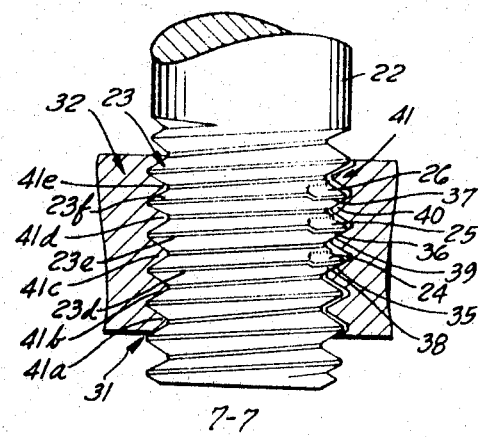
Figure 8:
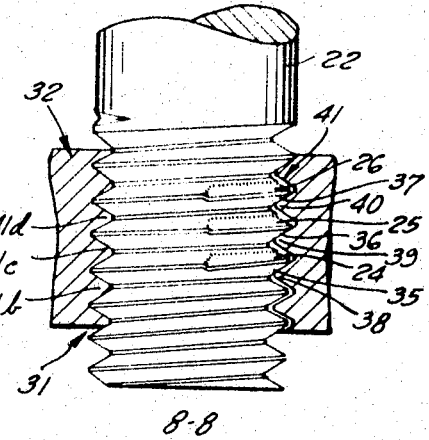
Figure 10:
FIG. 10 is a view on line 10—10 of FIG. 9 showing the offset segment in one turn of the thread.
Figure 9:
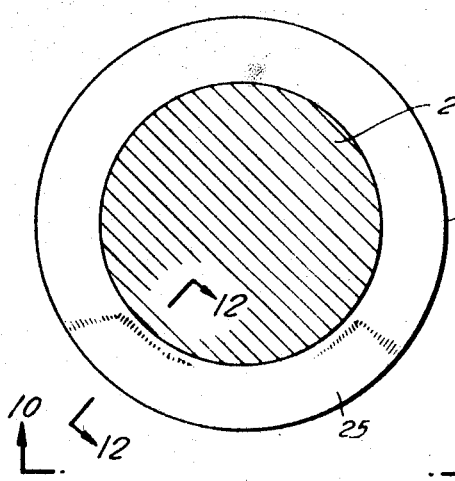
FIG. 9 is a view to larger scale on line 9—9 of FIG. 1.
Figure 11:
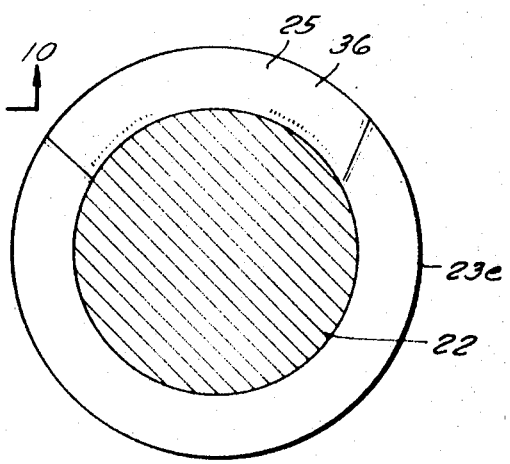
FIG. 11 is a view on line 11—11 of FIG. 10.

The spring action of the offset segments along their lengths is illustrated in FIGS. 3 to 13. It will be understood that the drawings are exaggerated for illustrative purposes. In FIG. 3, the screw is shown with the threaded shank screwed home into a mating tapped bore 31 of a nut 32; this view being on line 3—3 of FIG. 4. It will be observed (also see FIG. 7) that the middle portion of the lower flanks 35, 36, 37 of the offset segments 24, 25, 26 in turns 23d, 23e, 23f of the thread 23 frictionally engage and exert a spring action force downwardly upon the upper flanks 38, 39, 40 of turns 41b, 41c, 41d of the female thread 41 of the threaded bore 31. Referring now to FIG. 7, which is on line 7—7 of FIG. 4, and to FIG. 8, which is on line 8—8 of FIG. 4, it will be observed that the lower flanks 35, 36, 37 of the offset locking segments 24, 25, 26 frictionally engage and exert a spring action force downwardly on the upper flanks 38, 39, 40 of the turns 41b, 41c, 41d of the female thread 41 of bore 31. The spring action is uniformly distributed throughout the lengths of the offset segments, because the helix angle of the offset segments throughout their lengths is the same as the conventional helix angle of the remainder of thread 23 which is, of course, the same as the helix angle of the mating female thread 41.

Figure 12:
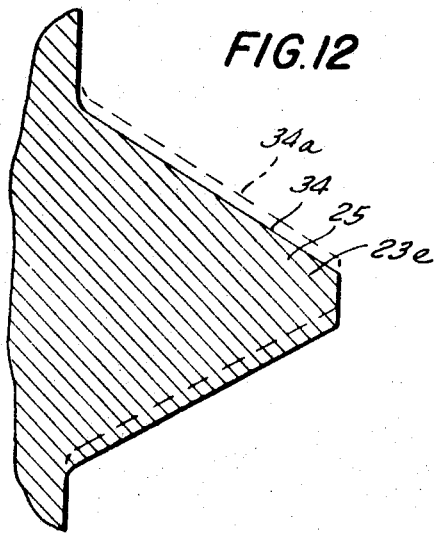
FIG. 12 is a view on line 12—12 of FIG. 9.
Figure 13:
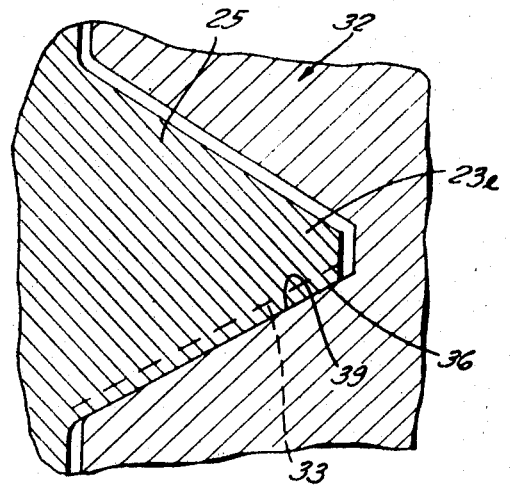
FIG. 13 is a view similar to FIG. 12 to illustrate the locking effect of the offset segment when the screw shown in FIG. 1 is screwed home in a mating female threaded bore.
Figure 16:
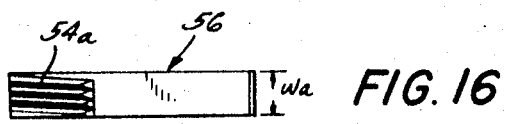
FIG. 16 is a view in elevation to smaller scale of the face of the insert.
Figure 17:
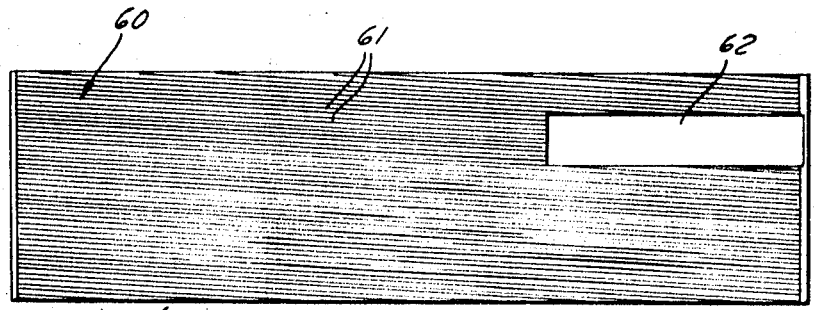
FIG. 17 is a face view of the stationary die of the pair of dies for rolling the thread.
Figure 18:
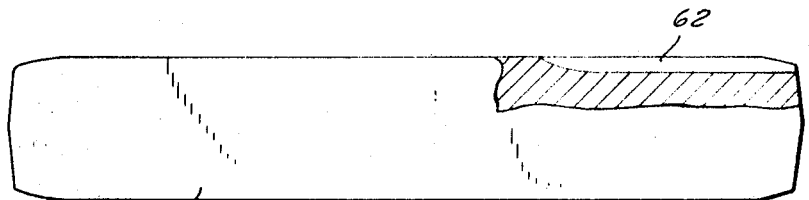
FIG. 18 is a plan view partly in section of the stationary die shown in FIG. 17.

The spring action of the offset locking segments is further illustrated in exaggerated fashion in FIGS. 9 to 13, which are enlarged views illustrating a single turn of the thread having an offset locking segment 25 in thread turn 23e. It will be observed that when the screw is screwed home in locking position (see FIG. 13), the lower flank 36 of the offset segment 25 engages the upper flank 39 of the mating female thread of the nut 32. The offset locking segment exerts a spring action force against the upper flank 39 of the mating female thread. The broken line 33 indicates the lower flank of the remainder of the turn 23e of the thread which is conventional or standard. FIG. 12 is a view on line 12—12 of FIG. 9, and at broken line 34a shows the upper flank of the undistorted part of the turn 23e of the thread, the line 34 indicating the upper flank of the offset segment 25.

Referring now to FIG. 5, which is on line 5—5 of FIG. 4, and to FIG. 6, which is on line 6—6 of FIG. 4, it will be observed that the lower flanks 42a, 42c, 42d, 42e, of thread 23 in the arcs of the thread which are diametrically opposite the offset segments 24, 25, 26, exert a force downwardly on the upper flanks of the turns 41a, 41b, 41c, 41d, 41e of the female thread 41. That is, the lower flanks of the screw thread in the 180° arc α diametrically opposite the offset locking segments (see FIG. 4) exert additonal frictional force downwardly on the upper flanks of the female thread in that arc. This is brought about by the forces resulting from the spring action of the offset segments which exert a downward force on the upper flanks of the female thread in the arc where they contact, because in the screw shown in FIG. 1, now being described, all of the offset segments 24, 25, 26 are offset downwardly; i.e., in a direction toward the leading end of the screw. That is, the offset lower flanks of the offset segments exert forces downwardly upon the upper flanks of the female thread where the offset segments engage them and the result is that this urges the shank of the screw 20 to slightly cock from its vertical axis so that the portions of the thread of the shank in the 180° arc diametrically opposite the offset segments exert forces in such manner that the lower flanks of the screw thread in that arc exert forces downwardly on the upper flanks of their mating female thread in that arc. Thus the screw, when it is screwed home into the mating tapped bore, not only has the locking effect of the spring action of the offset segments all along their lengths but, in addition, has an increased locking effect because of the additional friction where the lower flanks of the screw thread of the conventional portion of the screw thread engages the flanks of the female thread in the arc diametrically opposite the locking segments of the screw thread.

Figure 19:
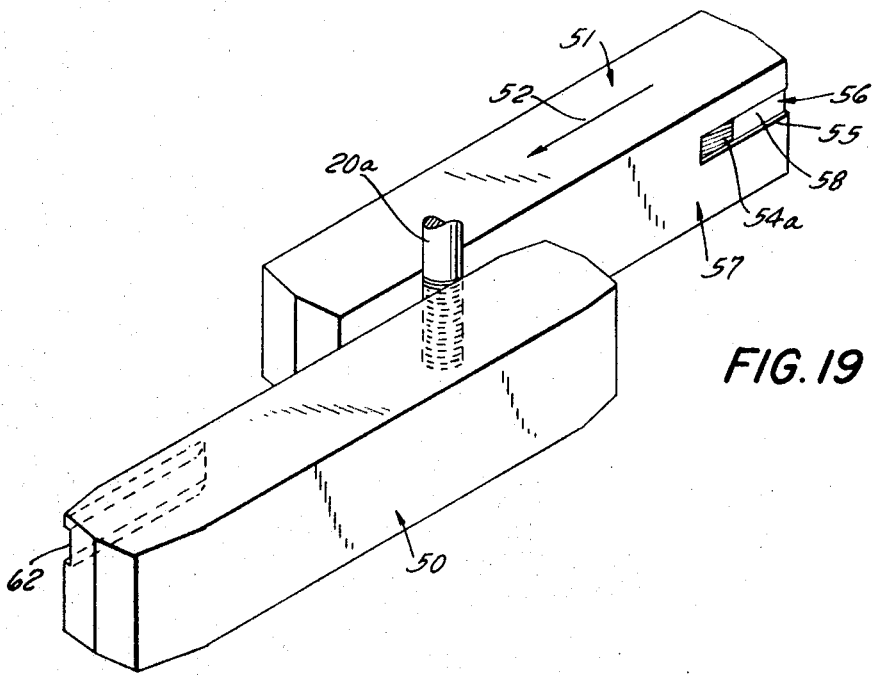
FIG. 19 is a view in perspective and somewhat diagrammatic to illustrate rolling of the screw shank between the stationary and moving die.

FIGS. 14-19 illustrate the thread rolling dies and manner of offsetting the locking segments in certain turns of the thread. Referring first to FIG. 19, there is shown a stationary die 50 and the moving or traveling die 51. Thread rolling machines are well known in the art. The screw blank 20a is rolled between these dies in conventional manner, but the die faces are suitably modified to perform the function of forming the offset segments in certain turns of the rolled thread. In the rolling operation the die 51 is moved to the left as indicated by arrow 52, causing the screw 20a to roll, also in the direction or arrow 52, between the stationary and traveling die. The faces of the dies are provided with milled threading grooves of known cross-sectional configuration, the slope and pitch of which correspond to the helix angle and pitch of the thread to be formed on the shank of the screw.

It will be noted that the moving die 51 is provided with a cutout or slot 55 at its trailing end to accommodate an insert 56 which is fitted into the slot 55. The face 57 of the die 51 is provided with milled grooves 54 having the pitch and helix angle of the rolled thread. The insert 56 has a length corresponding to the length of slot 55 and a width Wa, so that it fits snugly into the slot. The leading end of the insert is provided with grooves 54a of the same slope and pitch as the grooves 54. The length Lg of the grooves 54a is made to correspond to the length l of the offset segments desired in the thread of the screw and the number of thread forming grooves in the segment is the same as the number of offset segments desired in the finished screw. The trailing portion 58 of the face of the insert is cut away so that no part of the die will interfere with the offset segments of the thread after they have been rolled on the shank of the screw.

It is significant to note that the milled grooves 54a of the insert, when the insert is in place, are vertically offset downwardly from the milled grooves 54 by an amount that will produce the desired offset of the locking segments. Preferably, an offset of ⅓ of the pitch is provided, although if a different amount of offset is desired, the grooves may be offset any desired amount up to ⅜ of the pitch.

The face 60 of the stationary die has appropriate milled grooves 61 of the same slope and pitch as face 57 of the moving die. The face of this die has a cutout portion 62 at its trailing or leave-off end corresponding to the length of the insert slot 55 of the moving die, so that once the conventional thread has been formed by the faces 57 and 60 and the locking offset segments are rolled in by the die insert of the moving die, the formed offset segments will not be disturbed or rolled back to a position in line with the remainder of the thread which is of conventional pitch and helix angle.

In the foregoing embodiment of the invention, the offset locking segments have been shown as deflected in downward direction, but it will be understood that the invention contemplates offsetting the locking segments in an upward direction as well, in which case the insert used in the moving thread-rolling die will be positioned in such manner that the grooves 54a would be offset upwardly from the grooves 54, the requisite amount. In such case, the offset locking segments would exert a spring action on the lower flanks of the female mating thread. If desired, some of the thread segments in the cluster of offset segments may be offset in downward direction and others in an upward direction. For example, the screw 120, shown in FIG. 20, has some of the offset segment offset downwardly, i.e. in an axial direction toward the leading end of the screw and has some of the offset segments offset upwardly; i.e. in an axial direction toward the head of the screw. The cluster of offset segments, in the embodiment as shown in FIG. 20, has the thread segments in adjacent pairs of offset thread segments offset toward each other so that the offset segments of each pair exert spring action forces on the mating female thread; one offset thread segment of a pair exerting a spring action force downwardly on the upper flank of a thread turn of the tapped female bore, and the other offset segment of that pair exerting a spring action force upwardly on the lower flank of the same turn of the female thread of the bore in the workpiece. And in some instances, particularly if the screw is short in length, a screw embodying the principles of the invention may have a thread having only one free spinning turn at the leading end of the thread and only one or two turns of the thread having an offset segment intermediate the leading free spinning end portion and trailing end of the thread.

Referring now more particularly to FIGS. 20, 21 and 22, there is illustrated an embodiment of the invention having a plurality of pairs of offset segments in which certain segments are offset toward each other. The screw 120, having a head 121 to accommodate a suitable wrenching tool, has a threaded shank 122 and thread 123, the successive thread turns being indicated by reference characters 123a to 123q. Located intermediate the leading end and trailing end of the thread 123 is a plurality of vertically aligned offset thread segments 124a, b, c, d, e, each of which is offset downwardly, and offset thread segments 125b, c, d, e, each of which is offset upwardly. These offset thread segments have a substantial, arcuate length and they form a cluster of offset segments 127. The arcuate length, i.e, the circumferential length L of these locking offset segments may be within the range of 5% to 50% of the circumference of a turn of the thread. The depth d of the offset of the locking segments should be less than half of the pitch p of the thread and may be any suitable amount up to about 35% of the pitch in certain instances. As shown in FIG. 20, the thread segments are offset an amount which is 15% of the pitch of the thread. By making the arcuate length of the offset segments longer, a greater frictional and spring action locking effect may be obtained and by decreasing the length, a decreased locking effect may be obtained. Also, by increasing the depth of the offset of the thread segments a greater locking effect may be obtained. By decreasing the depth, a lesser locking effect may be obtained. Also, by increasing or decreasing the number of thread turns that have offset thread segments, the locking effect may respectively be increased or decreased.

The threaded part of the screw shank may be considered as having a free spinning, leading end portion 128 in which the thread is conventional and undeflected; a trailing end portion 130 in which the thread turns do not have offsets and are conventional and undeflected; and a locking portion 129, located intermediate portions 128 and 130; the cluster 127 of offset segments being located in the intermediate locking portion 129. It is significant to observe that the crest portions of the offset segments in the cluster 127 of offset segments are at the same helix angle along their entire lengths, as the helix angle of the remaining undistorted portion of the thread 123, the thread 123 being conventional, except for the offset thread segments. And the crests of all the thread turns including the crests of the offset thread segments, lie in an imaginary right cylinder. The axial width Wc of the crest portions of the thread 123, including the offset segments, as shown, is uniform. That is, the crests are not blunted as might be caused by certain punching tools. In some instances, however, it might be possible to roll threads on the shank with offset segments where the crests of the thread might not be of uniform width throughout the length of the entire thread. It will be observed that the screw, as shown, has a constant major diameter throughout the axial length of the threaded portion and the crests of the turns of the thread are uniform in axial width. It will be understood, of course, that if the screw has a tapered leading end, the threads at the leading end portion of such a screw may not have fully formed thread turns and the thread turns of the tapered portion will progressively increase in radial width in a direction toward the head end of the screw and the crests of the partially formed thread turns will decrease in axial width. Accordingly, it will be understood that it will be the effective threaded portion beginning at the trailing end of the tapered portion of such a screw and ending at the trailing end of the thread which will have constant crest and root diameters; i.e., constant major and minor diameters. The consequence of having the offset segments at the same helix angle as the helix angle of the remainder of the thread is that when the screw is screwed home into locking position into a mating conventionally tapped bore, the offset segments, when offset toward each other, exert a spring action force upon the upper and lower flanks of the thread of the tapped bore, these spring action forces being uniformly distributed along the circumferential length of the offset locking segments. And it will be seen that with regard to each pair of offset segments in which the segments are offset toward each other, the upwardly offset segment of that pair exerts a spring action force upwardly on the lower flank of the mating turn of the female thread in the tapped bore and the downwardly offset segment of that pair exerts a spring action force downwardly on the upper flank of that same turn of the female thread. Also, it is within the contemplation of the invention that in certain instances the cluster of offset segments may consist of only one pair of offset segments offset toward each other.

Referring now more particularly to FIG. 22, illustrating the shank of the screw 120 turned home in a conventionally tapped bore 131 of a workpiece 132, it will be seen that downwardly offset segment 124a exerts a spring action force downwardly on the upper flank 135a of the female thread turn 141b of female thread 141. The upwardly offset segment 125b of the thread 123 exerts an upward spring action force on the lower flank 136b of turn 141d of the female thread, and the downwardly offset segment 124b of the pair (125b, 124b) of offset segments exerts a downward spring action force on the upper flank 135c of the same turn 141d of the female thread 141. This, in effect, causes the pair of offset segments 124b, 125b to resiliently and frictionally squeeze that thread turn of the female thread between that pair 124b, 125b of offset segments to provide an effective locking means to inhibit loosening of the screw in the tapped bore 131 after the screw is driven home in the female threaded bore. The pairs of offset segments 124c, 125c and 124d, 125d, and 124e and 125e, function in the same way as the pair of offset segments 124b, 125b; that is, the downwardly offset segments exert forces downwardly on the upper flank of the mating turn of the female thread and the upwardly offset segments exert forces upwardly on the lower flank of the mating turn of the female thread so that alternate thread turns of the female thread, as shown in FIG. 22, are resiliently gripped between pairs of offset thread segments of the male thread to effectively lock the screw from loosening itself as a result of vibration or other analogous loosening forces. That is, the alternate thread turns of the female thread are resiliently clamped between a pair of the spring action offset thread segments of the screw. Yet, the screw may be turned to loosen and remove it when desired by using a suitable wrenching or turning tool.

In the embodiment illustrated in FIGS. 20, 21, 22, there is also a locking action or effect in addition to that afforded by the offset thread segments, when the screw is driven home in a conventional female threaded bore. The resulting forces due to the spring action of the offset segments 124a, b, c, d, e, and offset segments 125b, c, d, e on the female thread, also act on the shank of the screw in a lateral direction toward the 180° arc B diametrically opposite the cluster 127 of offset segments. The vertical central axis x–x of the shank shifts slightly in a lateral direction diametrically away from the cluster 127 of offset thread segments and this causes both the upper and lower flanks of the male thread 123 in the arc B to engage the upper and lower flanks of the female thread 141 in that arc diametrically opposite the cluster of offset segments with greater friction than is the case of a conventionally threaded screw in a conventionally threaded female bore. FIG. 22 is somewhat exaggerated to illustrate this clearly. Thus, the screw as illustrated in FIGS. 20, 21, 23 has an enhanced frictional locking effect in addition to the locking effect due to the cluster 127 of locking offset thread segments.

FIGS. 23–32 illustrate the thread rolling dies and manner of offsetting the locking thread segments in certain turns of the thread to form the cluster of offset segments in which the thread segments of adjacent pairs of segments are offset in axial direction toward each other. Referring to FIG. 32, there is illustrated a travelling thread rolling die 150 and a stationary thread rolling die 151 for use in a known thread rolling machine. The screw blank 120a is rolled between these dies in conventional manner. The die faces are suitably formed to perform the function of forming the thread on the shank of the screw with offset segments as shown in FIG. 20. In the rolling operation the die 150 is moved to the right as indicated by arrow 152, causing the screw to roll between the stationary and travelling dies in the direction of arrow 152.

The face 157 of the stationary die 151 (see FIG. 23) is provided with milled thread rolling grooves 157a of conventional configuration or profile, the slope and pitch of which correspond to the helix angle and pitch of the thread to be formed on the shank of the screw. However, the stationary die is provided with a cut-out or slot 155. This slot has a vertically disposed leading end 155a, and the top and bottom sides 155b and 155c slope at an angle parallel with the grooves 157a of the face 157. That is, the slot 155 slopes at an angle qual to the helix angle of the thread. The slot 155 is dimensioned to accommodate an insert 156 which is snugly fitted into the slot 155, which is sometimes referred to as pocket 155. The insert 156 has a length corresponding to the length of the slot and a width Wb to provide a snug fit. The leading end of the insert is provided with grooves 154a of the same amount of pitch as the grooves 157a of the face of the die 151, the length Lg of the grooves 154a corresponding to the length L of the offset thread segments (see FIG. 20). It will be observed that the insert is of generally rectangular shape and the thread rolling grooves 154a run parallel with the top edge 155d and the bottom edge 155e. However, the end edge 155f of the insert is not perpendicular to the bottom edge 155e, but is slightly inclined so that this edge 155f lies flush with the end of the die 151, when the insert is positioned in its sloped slot 155. Consequently, when the thus shaped insert is fitted into the insert slot 155 (which slopes at an angle equal to the helix angle of the grooves 157a) the grooves 154a of the insert then lie at the same helix angle as the grooves 157a. However, the bottoms of the grooves 154a are offset from the bottoms of the grooves 157a as described in further detail hereinafter. The number of thread forming grooves in the insert corresponds to the number of offset thread segments desired in the finished screw. The trailing portion 158 of the insert is inclined toward the rear wall of the die so that no part of the die will interfere with the offset segments after they have been rolled on the shank of the screw.

The face 160 of the travelling die 150 (see FIG. 30) has milled grooves 161a having the same helix angle and the same pitch as the grooves 157a in the face 157 of the stationary die 151. A relief or cutout portion at the trailing or leave-off end of the travelling die 150 is not necessary as the threaded screw is separated from the dies 150, 151 at the leav-off end almost instantaneously after the cluster of offset thread segments are formed so that once the offset thread segments are rolled in by the die insert of the stationary die, the formed offset segments will not be disturbed.

Referring now to FIG. 29, there is shown in more or less diagrammatic fashion in further detail and to larger scale, a profile of the thread rolling grooves 154a of the insert 156 (see also FIGS. 25–27). An insert properly dimensioned and made according to this profile (FIG. 29), will form the offset thread segments 124a to 124e and 125b to 125e (see FIGS. 20–22) in the thread 123 of the threaded shank 122 of the screw. Broken line 165 represents the profile of the conventional grooves 157a on face 157 of the stationary die 151. The apices 166a to 166j of the grooves 154a are conventional and are the same as, and register with, the apices of the grooves 157a of face 157 of the stationary thread rolling die. That is, the apices 166a to 166j register with the apices of the grooves 157a when the insert is inserted in slot 155, so that the apices of the insert form continuations of the apices 157a in straight line relationship. Sometimes the rolling of the blanks in the thread rolling dies may cause a chipping of the ridges of the dies. To avoid or inhibit such chipping of the apices of the grooves 157a and the apices 166a to 166j of the insert where they join, it is desirable to bevel or round off slightly the meeting ends of these apices or ridges. This also minimizes any shearing action of the ridges of the dies on the rolled thread. The apices 166a to 166j, which may also be referred to as the ridges of the grooves of the die will, of course, form the root 167 of the thread 123 of the screw in the thread rolling operation. The root 167 of the thread of the screw is conventional and the minor diameter of the shank of the screw 120 is constant throughout the axial length of the threaded portion of the shank. The bottoms of the thread rolling die will, of course, form the crests of the thread of the screw. The bottoms 168a to 168i of the grooves of the insert, which will form the crests of the offset thread segments of the screw, are shifted axially from the profile of the conventional grooves in a manner now to be described; the profile of the conventional or standard grooves (comprising bottoms and apices or ridges) being indicated by broken line 165 in FIG. 29. Broken line 165a represents the profile of a conventional screw thread.

To lay out the profile of the grooves in the insert, the height h (see FIG. 29) of the profile of the grooves of the conventional grooves is divided into an apex or ridge portion 170a, a bottom portion 170c, and an intermediate portion 170b. As shown, the height h is divided into three portions 170a, 170b, 170c; the profile of the normal or conventional grooves being indicated by broken line 165. The pitch P from apex to apex of the grooves is normal or conventional. These apices 166a to 166j form the root 167 of the screw thread 123 in the thread rolling operation. Thus, the root 167 is normal or conventional and the root diameter of the threaded portion of the screw is constant. However, the bottoms (168a to 168i) in the portion 170c of the grooves are shifted axially from the conventional profile 165; the bottoms 168a, c, e, g, i (in the one third portion 170c) being shifted axially toward the lower end of the insert (i.e., toward the leading end of the screw to be formed) and the bottoms 168b, d, f, h (in the one third portion 170c) being shifted axially toward the upper end of the insert (i.e., toward the head or trailing end of the screw to be formed). The bottoms of the grooves in the portion 170c are each shifted axially in the direction mentioned above by an amount indicated at 171a and 171b. As shown, the bottoms (in the one third portion 170c) are shifted from the normal or conventional (indicated by broken line 165) a certain amount of the pitch P (see FIG. 29). As shown, the bottoms are shifted a distance from normal which amount is 15% of the pitch P; that is, the bottoms are shifted a distance indicated at 171a and 171b. However, the bottoms may be shifted a distance within the range of 3% to 35% of the pitch P, depending on the kind of metal in the screw to be formed; the size of the thread and locking characteristics desired in the finished thread. Having shifted the bottoms to the desired positions on the profile (FIG. 29); the apices 166a to 166j (in the one third portion 170a) and the bottoms 168a to 168i (in the one third portions 170c) are joined by substantially straight lines 169a to 169r (in the intermediate one third portion 170b); the connection lines 169a to 169r being merged with the apices and bottoms of the grooves in a manner to avoid sharp junctures. The face of the blank for forming the insert 156 is then milled or otherwise treated to produce the grooves 154a on the face of the insert to conform to the profile as shown and described; the length of these grooves being dimensioned to correspond to the length L of the offset thread segments desired in the thread of the finished screw.

As shown in FIG. 29, the height h from the apex of the bottom of the groove to the apex of the ridge of the groove, has been divided into three equal parts (ridge portion 170a, bottom portion 170c and intermediate portion 170b), but the proportional heights of these portions, 170a, b, c, may be varied depending on the kind of metal that is to be used to make the screw, the size and kind of thread and the locking effect desired. For example, the height of the bottom portion 170c, which is to form the crest portions of the offset thread segments in the thread of the screw and the height of the ridge portion 170a, which is to form the root portions of the thread where the offset segments are located, may be within the range of ¼ to ½ the height h, measured from the apex of the bottom portion to the apex of the ridge portion of a groove of the insert.

There is an advantage in having the height in the portion 170c substantial because this increases the surface area along the offset thread segments of the screw which engage and frictionally contact the flanks of the female thread in the tapped bore of the workpiece. This surface area distributes the frictional locking forces over a larger surface area than an offset thread which is deflected from conventional in a manner such that the deflected portion of the thread contacts the flanks of the female thread in only a single line of contact.

Referring, for example, to the slopes of the flared sides 172, 173, and 174, 175 of bottoms 168e and 168d in the portion 170c (see FIG. 29) as typical of the bottoms of the grooves of the insert 156, it will be noted that sides 172, 173, 174, 175 of the bottoms 168e, 168d lie parallel to the adjacent broken line 165 which indicates the profile of the conventional grooves 157a of the face 157 of die 151. Hence, the slopes of the flared sides 172a, 173a, 174a, 175a of the crest portions 124c, 125c of the screw 120 lie parallel with adjacent slopes of broken line 165a, representing the profile of a conventional screw thread. Consequently, when the screw 120 is screwed into a mating tapped female bore 131 (see FIG. 22) the sloping sides 173a, 174a of the offset thread segments 124c, 125c contact the flanks of the female thread turn 141f of thread 141 in an area over the entire surface of the width and circumferential length of the contacting offset thread segments so that the frictional contact between the female thread and offset thread segments of the screw extends over a substantially larger surface area than would be the case if the offset thread segments contacted the adjacent flanks of the female thread in only a single line of contact.

Inasmuch as the bottoms of the grooves of the thread rolling dies produce the crests of the thread of the screw, when the screw thread is rolled on the screw blank, it is common practice to provide a blank which has a diameter equal to the pitch diameter of the threaded screw to be formed. The effect or results of rolling the thread on the screw blank by use of the insert 156 is illustrated at the right of FIG. 29. It will be seen that the thread segments are offset in a manner corresponding to the bottoms of the grooves of the insert. Offset thread segments 124b, 125b provide a pair of thread segments which are offset toward each other; and offset segments 124c, 125c; 124d, 125d; and 124e, 125e provide like pairs of segments which are offset toward each other (see also FIG. 22). The thread 123 is normal or conventional except for the offset thread segments. Thus, the screw 120, illustrated in FIG. 20, has a constant minor diameter and a constant major diameter throughout the axial length of the threaded portion of the shank. Hence, the apices of the crests of the turns of the thread (including the offset thread segments) lie at the surface of an imaginary right cylinder passing through the crests.

In the illustrative embodiments shown in the drawings, the thread is shown as a conventional V thread, but it will be understood that the principles of the invention may be applied to other forms of thread.

The terms and expressions which have been employed herein are used as terms of description and not of limitation, and there is no intention, in the use of such terms and expressions, of excluding any equivalents of the features shown and described or portions thereof, but it is recognized that various modifications are possible.

What is claimed is:

1. A one-piece all-metal prevailing-torque externally threaded fastener having a head portion and having a shank with an integrally formed external thread thereon, the turns of the thread on the shank having their crests lying in an imaginary right cylinder, the cylindrical surface of which passes through said crests, an axially offset resilient segment of substantial arcuate length in each of a plurality of turns of said thread, each of said segments being offset from the remainder of the turn in which it is located, said offset segments being positioned to form a cluster of vertically aligned offset segments of substantial arcuate length, the crests of which lie in said imaginary cylindrical surface, the crest of the entire thread including the offset segments being of uniform axial width throughout, said threaded shank having at least one free spinning thread turn at its leading end having no offset segments, said cluster of offset segments being positioned intermediate said leading free spinning thread turn and the trailing end of the threaded portion of said shank, the root diameter and root lead of said thread being uniform throughout the length of the threaded portion of the shank, and all of said offset segments in said cluster lying throughout their lengths at the same helix angle as the helix angle of the remainder of said thread.

2. A prevailing-torque lockscrew according to claim 1, in which said offset segments in said cluster are at least two in number and are offset less than half the pitch of the thread.

3. A threaded fastener according to claim 1, wherein the offset thread segments of at least one pair of adjacent offset segments in the cluster of offset segments are axially offset toward each other.

4. A threaded fastener according to claim 1, dimensioned to be screwed into a mating conventionally threaded female bore, wherein adjacent offset thread segments forming pairs of offset segments in the cluster of offset thread segments on the threaded shank are axially offset toward each other, so that one of the offset segments of each of the pairs exerts downward locking forces on the upper flank of a turn of the female thread of the mating female bore and the other of the offset segments in that pair exerts upward locking forces on the lower flank of that same turn of the female thread when said threaded shank is screwed home in the mating female bore.

5. A prevailing-torque lockscrew according to claim 2, in which all of the offset segments in said cluster are offset from ⅛ to ⅜ of the pitch of the thread and have an arcuate length within the range of 10% to 40% of the arcuate length of one full turn of the thread of the shank.

6. A prevailing-torque lockscrew according to claim 5, in which the arcuate length of each of the offset segments in said cluster is at least 30% of the arcuate length of one full turn of the thread of the shank.

7. A one-piece prevailing-torque lockscrew comprising an enlarged head and a threaded shank having integrally formed external threads thereon with the crests thereof lying on the surface of an imaginary right cylinder, the thread having axially depressed resilient segments of substantial arcuate length in at least three turns of the thread intermediate the first two turns of the thread at its leading end, and the last two turns of the thread at its trailing end, the thread being otherwise undistorted and having a conventional helix angle, said depressed segments forming a cluster of at least three depressed segments in vertical alignment, each of which is offset from the remainder of the turn in which it is located, said segments being offset less than half the pitch of the thread and lying throughout their lengths at an angle equal to the helix angle of, and parallel with, said undistorted portions of the thread, the crests of said offset segments lying in said imaginary cylindrical surface, the crest of the entire thread being of uniform axial width throughout, said offset segments frictionally engaging the mating flank of the female thread of a mating threaded bore with uniform spring action throughout their arcuate lengths to lock said screw in said mating threaded bore when said screw is screwed home into said bore.

8. A prevailing-torque lockscrew according to claim 7, in which the lower flanks of the tread on the shank in the arc diametrically opposite the cluster of offset locking segments exert a greater frictional force against the upper flanks of the mating female thread in that arc than a conventional threaded shank of the same size and dimensions when the screw is screwed home in the mating thread.

9. A threaded fastener according to claim 7, wherein the offset thread segments exert spring-like forces on the upper and lower flanks of the female thread which result in lateral forces causing the upper and lower flanks of the screw thread in an arc diametrically opposite the offset thread segments to frictionally contact and exert additional locking forces on the upper and lower flanks of the female thread of the bore.

10. A one-piece all-metal prevailing-torque threaded fastener having a head portion and a shank with an integrally formed external thread thereon dimensioned to mate with a conventionally threaded female bore, said threaded shank having a free spinning leading end portion, a trailing end portion and a locking portion intermediate said free spinning and trailing end portions, said locking portion having an axially offset resilient thread segment in at least one turn of the thread in said locking portion, said thread segment being offset less than half the pitch of said thread and having a radial width of ¼ to ½ the radial width of said thread measured from the crest of the offset segment to the root of the thread and having a substantial circumferential length between 5% and 50% of the circumferential length of said turn and lying throughout its length at an angle equal to and parallel with the helix angle of said thread, said threaded shank having a constant major and a constant minor diameter with the crest of said thread including said offset segment being of uniform axial width and the root of said thread being uniform throughout the length of the threaded portion of said shank.

11. A one-piece all metal prevailing-torque threaded fastener according to claim 10, in which the offset thread segment is axially offset from the remainder of the thread turn in which it is located by an amount which is 3% to 35% of the pitch of said thread so that there is larger surface area of the offset thread segment frictionally contacting the surface of the female thread of said female threaded bore when said fastener is screwed home in said bore than a single line contact between said offset thread segment and said female thread.

12. A one-piece all-metal prevailing-torque threaded fastener having a head portion and a shank with an integrally formed external thread thereon dimensioned to mate with a conventionally threaded female bore and having a constant major and a constant minor diameter, said threaded shank having a free spinning leading end portion, and a trailing end portion and a locking portion intermediate said free spinning and trailing end portions, said locking portion having at least one axially offset resilient thread segment in each of a pair of adjacent turns of the thread on said shank, each of said offset segments being offset less than half the pitch of said thread and forming a pair of offset thread segments offset toward each other, so that the female thread is resiliently clamped between said pair of offset thread segments when said shank is screwed home in said female bore, the offset thread segments having a radial width of from ¼ to ½ of the radial width of said thread measured from the crest of the offset segments to the root of the thread and having the same helix angle throughout their lengths as the helix angle of the remainder of the thread, the crests of said thread including said offset thread segments being of uniform axial width and the root diameter and the root lead of said thread being uniform throughout the length of the threaded portion of the shank.

13. An all-metal prevailing-torque threaded fastener according to claim 12, in which said offset thread segments are offset from the thread turns in which they are located an amount within the range of 3% to 35% of the pitch of said thread measured from crest to crest.

14. A prevailing-torque locking fastener according to claim 13, in which the thread segments have a circumferential length within the range of 5% and 50% of the circumference of a thread turn.

15. A prevailing-torque locking fastener according to claim 14, in which the offset thread segments have a radial width of about ⅓ the radial width of the thread and the offset thread segments are offset from the thread turns in which they are located an amount which is about 15% of the pitch of the thread measured from crest to crest.

16. A one-piece all-metal prevailing-torque threaded fastener having a head portion and a shank with an integrally formed external thread thereon dimensioned to mate with a conventionally threaded female bore, said fastener comprising a threaded shank having a free spinning leading end portion, a trailing end portion and a locking portion intermediate said free spinning and trailing end portions, a plurality of axially offset vertically aliged resilient offset thread segments in the turns of the thread in said intermediate portion forming a cluster of locking offset thread segments, said offset thread segments having the same helix angle throughout their circumferential lengths as the helix angle of the remainder of the thread of the shank, adjacent offset thread segments forming pairs of said offset thread segments in which the offset thread segments are axially offset toward each other forming pairs of resilient locking thread segments, wherein one of the offset segments of each pair exerts downward locking forces on the upper flank of a turn of the female thread and the other of the offset segments in that pair exerts upward locking forces on the lower flank of that same turn of the female thread when said threaded shank is screwed home in said female bore, the crests of said thread including said offset thread segments being of uniform axial width with said crests, including said offset thread segments, lying at the surface of an imaginary right cylinder, and the root diameter and root lead of said thread being uniform throughout the length of the threaded portion of the shank.

17. A threaded fastener according to claim 16, in which the upper and lower flanks of the thread on the shank in the arc diametrically opposite the cluster of offset segments exert a greater frictional force against the upper and lower flanks of the female thread in that arc than a conventional threaded shank of the same size and dimension when the screw is screwed home in the mating bore.

References Cited

UNITED STATES PATENTS

| 1,250,748 | 12/1917 | Woodward | 151—22 |
|---|---|---|---|
| 2,414,870 | 1/1947 | Harding | 151—22 |

FOREIGN PATENTS

| 1,186,278 | 1/1965 | Germany. |
|---|---|---|
| 512,008 | 8/1939 | Great Britain. |

RAMON S. BRITTS, Primary Examiner

U.S. Cl. X.R.

10—10; 72—88

PO-1050
(5/69)

UNITED STATES PATENT OFFICE
CERTIFICATE OF CORRECTION

Patent No. 3459250          Dated August 5, 1969

Inventor(s)    JOSEPH A. TABOR

It is certified that error appears in the above-identified patent and that said Letters Patent are hereby corrected as shown below:

Column 1, lines 3, 4, "Burdsall, Russell & Ward Bolt and Nut Company" should read -- Russell, Burdsall & Ward Bolt and Nut Company --;

Column 2, lines 59, 60, "Fig. 20 turned 90° from that show in Fig. 20; the which" should read -- Fig. 20 is a view in elevation of a form of screw in which --;

Column 5, line 32, "or" should read -- of --;

Column 6, line 11, "Segment" should read -- segments --;

Column 8, line 48, "she" should read -- the --;

Same Column 8, line 53, "qual" should read -- equal --;

Column 9, line 14, "leav-off" should read -- leave-off --;

Column 12, line 43 (line 2 of claim 8), "tread" should read -- thread --;

Column 14, line 11 (line 9 of claim 16), "aliged" should read -- aligned --.

SIGNED AND
SEALED
MAY 26 1970

(SEAL)
Attest:

Edward M. Fletcher, Jr.
Attesting Officer

WILLIAM E. SCHUYLER, JR.
Commissioner of Patents